Jan. 1, 1957  C. F. GREINER  2,775,925
PRESSURE CONTROL MEANS FOR ROAD ROLLERS
Filed May 27, 1952  6 Sheets-Sheet 1

INVENTORS
CARL F. GREINER
BY

HIS ATTORNEYS

Jan. 1, 1957     C. F. GREINER     2,775,925
PRESSURE CONTROL MEANS FOR ROAD ROLLERS
Filed May 27, 1952     6 Sheets-Sheet 5

INVENTORS
CARL F. GREINER

BY

HIS ATTORNEYS

United States Patent Office 2,775,925
Patented Jan. 1, 1957

2,775,925

PRESSURE CONTROL MEANS FOR ROAD ROLLERS

Carl F. Greiner, Springfield, Ohio, assignor to The Buffalo-Springfield Roller Co., Springfield, Ohio, a corporation of Ohio Application May 27, 1952, Serial No. 290,183

11 Claims. (Cl. 94—50)

This invention relates to a novel means for controlling the pressures applied by the several rolls of a road roller to the surface being rolled. In this regard, reference is also made to U. S. application Serial No. 169,749 for Three-Axle Rollers filed June 22, 1950, by John F. Harrison which contains claims to certain of the subject matter disclosed in the present application.

In two-axle, tandem, road rollers there is a definite accepted ratio between the weight at the drive roll and the weight at the guide roll. This ratio is approximately 2:1, the weight at the drive roll representing ⅔, and the weight at the guide roll representing ⅓, of the total weight of the machine. In rolling some materials this difference in weight is necessary because the characteristics of the material are such that the first pass of a compaction roll should be made with fairly light pressure for the initial setting of the material. After this first pass, the following roll may apply a much greater pressure without ill effects upon the material being rolled. Consequently, the roller is applied to the fresh material with the guide roll end of the machine leading. It is understood, of course, that the actual compaction by which maximum density is achieved is accomplished by the heavier drive roll. Many materials, however, such as soils, do not have the characteristics above outlined, and the guide roll has but little effect upon them and functions mainly to steer the machine. On such materials, there would need be no differential between the weight on the guide and drive rolls of the machine. In fact, more efficient rolling would be obtained on materials of this class by distributing the weight equally between the drive roll and the guide roll of the roller. Accordingly, it will be seen that it is desirable to be able to control the pressures applied to the ground by the several rolls of a road roller in various ways in order to best adapt the machine to the particular material being compacted so that maximum densification of the material may be achieved with the fewest number of passes of the roller.

In a three-axle machine of the type disclosed in U. S. Patent No. 2,132,059, issued October 4, 1938, to George E. Trembly, it is possible to establish different relative elevations of the axles of the three-axle roller disclosed therein so that the rolls may be made to follow any desired road contour, that is, either a flat surface, a concave surface, or a convex surface. It is also possible, in the Trembly machine, to cause different pressures to be applied by the several rolls thereof to the road surface, this being accomplished by selectively elevating either the center roll or one of the end rolls off the ground to thereby alter the distribution of weight upon the rolls. This expedient, however, enables but two optional pressure distribution to be effected, neither of which may fully satisfy the pressure requirements of the particular material being rolled.

In order to overcome this difficulty and to provide for an unlimited number of different pressure distributions on the rolls of a tandem roller having three or more axles, I have devised a novel means for determining and controlling the pressures which will be applied by each of the several rolls of the machine to the surface over which the roller operates. Thus, the initial pass of a roll can be made with the exact pressure required for best performance in the case of the particular material being rolled, instead of with a pressure which merely approximates the optimum pressure for that material.

Furthermore, in a roller constructed in accordance with the teachings of my invention, the rolls of the machine will continuously follow the contour of the ground and will always apply a constant, preselected pressure thereto regardless of any irregularities in the road surface.

My new pressure control device will also positively prevent an overload being applied to the materials being rolled. This is accomplished by selecting an applied pressure for the roll making the initial pass which is below the overload pressure for the material. Hence, it will be impossible for that roll to exert a pressure exceeding the overload pressure. In this connection, it is important to observe that the customary three-axle load transfer action cannot operate to cause the roll to apply a pressure greater than the overload pressure for the material since the pressure control mechanism will permit the roll to yield before the overload pressure is reached and thereby avoid application of excessive pressure to the material being compacted.

Accordingly, it is an object of my invention to provide a pressure control means for road rollers of the type having three or more rolls arranged in tandem, which means will enable infinitely variable pressures to be applied by certain of the rolls to the surface being rolled.

Another object of my invention is to provide a pressure control means of the character set forth in the preceding object in which the rolls of the road roller will be free to follow the natural contours of the road.

Another object is to provide a road roller of the type having a drive roll and two or more idler rolls arranged in tandem in which the idler rolls may be caused to apply a preselected pressure to the road surface over which the roller is operating. Thus, in a machine incorporating my novel pressure control, the initial pass of a roll can be made with the exact pressure desired, whereas in existing machines such as Trembly, a selection of only a few different pressures can be made.

Another object is to provide a road roller which can be adjusted to prevent an overload being applied to the materials being rolled. This may be done by setting the pressure control device at a desired maximum pressure. If the load transfer action tends to cause a pressure greater than the maximum pressure to be applied to any of the rolls, the pressure control mechanism will operate to prevent the application of such pressure.

Another object is to provide a road roller of the type having three or more rolls arranged in tandem in which a pressure distribution other than that determined by the natural function of various combinations of levers in the machine structure can be preselected. All of the prior art machines with which I am familiar relied, for weight distribution, on this natural functioning of various combinations of levers in the machine structure and, hence, were in fact, limited to fixed values with an optional selection of only a few different combinations.

With these and other objects in view which will become apparent from the following description, the invention includes certain novel features of design and combinations of parts, the essential elements of which are set forth in the appended claims and a preferred form or embodiment of which will hereinafter be described with reference to the drawings which accompany and form a part of this specification.

Figure 1:
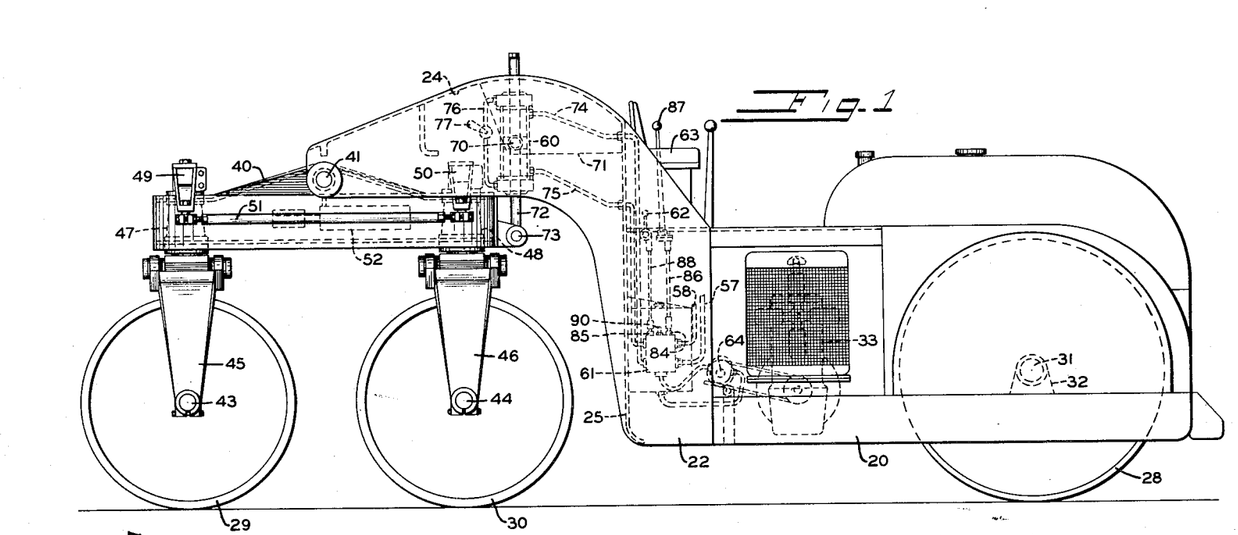
Figure 1 is a side elevation of a three-axle tandem road roller incorporating my novel pressure control means.
Figure 2:
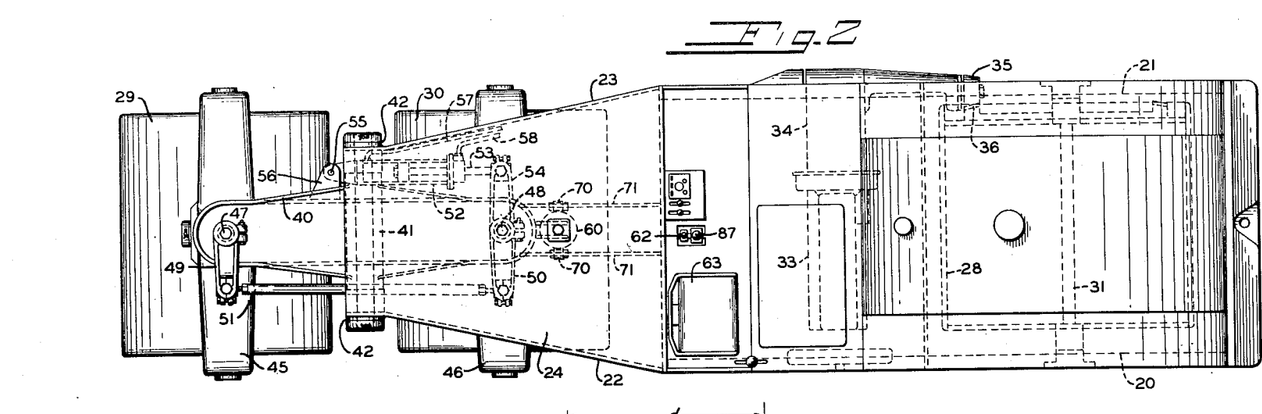
Fig. 2 is a top plan view of the road roller shown in Fig. 1.

In Figs. 1 and 2 of the drawings, I have shown my novel pressure control means as applied to a three-axle tandem road roller of the walking-beam type. However, as will be more fully explained hereinafter, my invention may also be applied to other types of road rollers having three or more axles arranged in tandem. The road roller shown in Figs. 1 and 2 has a frame which includes a pair of spaced side rails 20 and 21 which, at their rear ends, are connected to the lower ends of a pair of arch plates 22 and 23 which are curved upwardly and rearwardly and are connected together along their top edge by a cover plate 24. The forward end of this plate is bent down to form a vertical wall or shield 25 enclosing the rear end of the roller frame.

The road roller shown herein is of the three-axle type and is provided with a drive roll 28 and two guide rolls 29 and 30. The drive roll 28 is journaled on an axle 31 which is supported at either end by brackets 32 supported on the side rails 20 and 21. The drive roll 28 is arranged to be driven by an engine 33 (Fig. 2) which is supported between the side rails 20 and 21 and which, through a transmission 34, drives a bevel gear 35 which meshes with a ring gear 36 secured to the drive roll 28.

The guide rolls 29 and 30 are supported by a walking-beam 40 which is supported at its mid-pont by a pivot pin 41 journaled in spaced bearings 42 carried by the arch plates 22 and 23. The rolls 29 and 30 are journaled on axles 43 and 44, respectively, which are supported between the arms of their respective steering yokes 45 and 46. The yokes 45 and 46 are provided with king pins 47 and 48, respectively, which are journaled in opposite ends of the walking-beam to turn about vertical axes. The turning of the king pins in the bearings provided therefore in the walking-beam 40 is controlled by steering arms 49 and 50 which are non-rotatably connected with the king pins 47 and 48, respectively. The outer ends of arms 49 and 50 are connected together by a steering link 51 so as to cause conjoint turning movement of the steering yokes 45 and 46.

The road roller is provided with a power-steer mechanism which includes a hydraulic cylinder 52 having piston rod 53 which is connected to an arm 54 secured to the king pin 48 and the steering arm 50. The closed end of the cylinder 52 is pivoted at 55 on a bracket 56 projecting from the side of the walking-beam 40. Oil under pressure may be admitted to either end of the cylinder 52 by means of fluid pressure lines 57 and 58 which are connected to a hydraulic control valve in a manner to be hereinafter described. Hence, by suitable control of the flow of oil to the hydraulic cylinder 52, the king pin 48 may be selectively turned in one direction or another in its bearing in the walking-beam 40. At the same time, coordinated steering of the guide roll 29 will be effected by means of the connecting link 51 which will cause king pin 47 to be rotated on its bearing in the walking-beam.

For the purpose of controlling the pressure applied by the rolls 29 and 30 against the surface being rolled, I have provided the roller with a novel pressure control means including a double-acting hydraulic cylinder 60, a pressure control valve 61, and a control lever 62 by means of which the operator can control the valve 61 while sitting on the operator's seat 63. Fluid under pressure for operating the hydraulic system of the roller, including the power steer mechanism and the pressure control device, is supplied by a pump 64 which is arranged to be driven from the engine 33 of the roller.

As shown in Figs. 1 and 2, the cylinder 60 is supported on trunnions 70 which are journaled in wing plates 71 fastened to and depending from the cover plate 24. The cylinder is provided with a piston rod 72 which, at its lower end, is pivotally connected at 73 with a bracket fast on the walking-beam 40. Fluid under pressure may be applied to either end of the cylinder 60 by means of fluid pressure lines 74 and 75 which are communicatively connected with opposite ends of the cylinder and are also connected with the ports of the pressure control valve 61 so as to enable fluid at a predetermined, constant pressure to be admitted to either end of the cylinder 60. In this way, a constant torque may be applied to the walking-beam 40 tending to rotate it in either a clockwise or counterclockwise direction about the pivot pin 41. Hence, by controlling the pressure of the fluid supplied to the cylinder 60, and by selecting the side of the cylinder to which it is to be delivered, the guide rolls 29 and 30 may be caused to bear with any desired pressure, up to the capacity of the roller, against the surface being rolled.

The cylinder 60 is also provided with a by-pass line 76 which connects the opposite ends of the cylinder 60. A cut-off valve 77 is provided in the line 76 so as to enable fluid to be by-passed or not between the opposite ends of the cylinder 60 as may be desired. When the valve 77 is opened, oil may flow through the line 76 thereby permitting free, floating action of the walking-beam 40 with equal pressures being applied by both rolls 29 and 30. However, when the pressure control means is rendered active, the valve 77 must be closed and prevent oil from flowing through the line 76 so that normal operation of the pressure control means may be effected.

Figure 4:
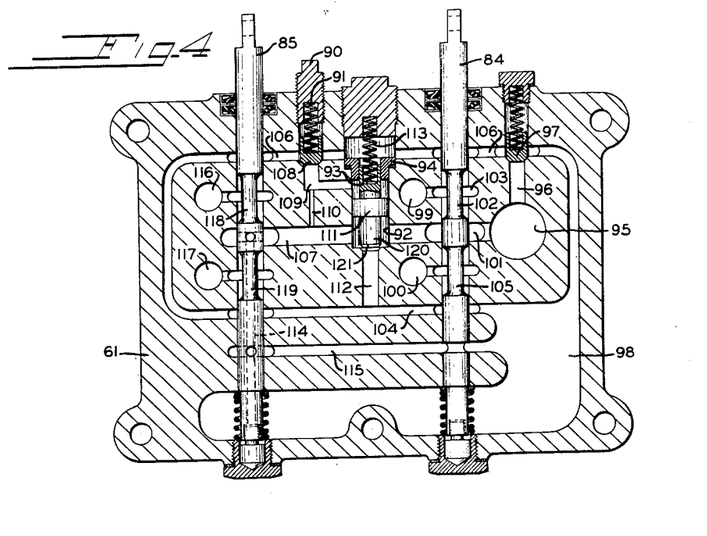
Fig. 4 is a cross-sectional view of the pressure control valve.
Figure 5:
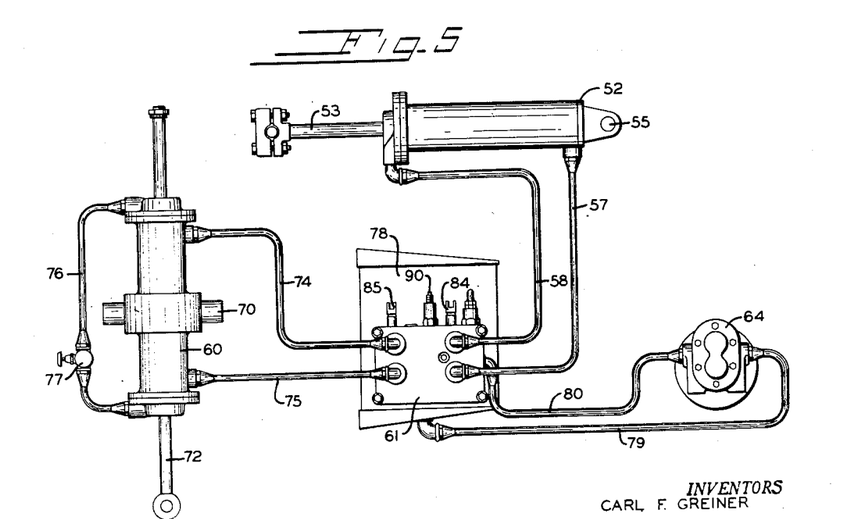
Fig. 5 is a diagrammatic view of the hydraulic system of the road roller shown in Fig. 1 including the pump, pressure control valve, steering cylinder, and pressure control cylinder.

The hydraulic system of the road roller is clearly illustrated in Fig. 5 wherein it will be seen that oil, or other suitable hydraulic fluid, is drawn from the bottom of a sump tank 78 (Fig. 5) through an oil line 79 connected to the low pressure side of pump 64. The high pressure side of pump 64 is connected by a line 80 with pressure control valve 61. As shown in Fig. 5, this valve is provided with four ports, two of which are connected with the fluid pressure lines 57 and 58 for the power steer cylinder 52, and the other two of which are connected with the fluid pressure lines 74 and 75 for the fluid pressure control cylinder 60. The valve 61 is provided with two valve spindles 84 and 85 (Fig. 4), the spindle 84 controlling the flow of fluid to the power steer cylinder 52 through either line 57 or 58 depending upon the direction of movement of the spindle. In a similar manner, spindle 85 controls the flow of fluid to the pressure control cylinder 60 through either line 74 or 75 depending upon the direction in which the spindle 85 is moved. As shown in Fig. 1, the spindle 84 is connected by a link 86 with the lower end of a steering lever 87 which is located adjacent the left side of the driver's seat 63. As also shown in Fig. 1, the spindle 85 is connected by a link 88 with the lower end of the control lever 62 located, like the steering lever 87, just to the left of the driver's seat 63. The pressure at which fluid will be delivered to the pressure control cylinder 60 may be determined by a pressure adjusting screw 90 located on top of the valve 61.

An understanding of the operation of the pressure control valve 61 may be best obtained by referring to Fig. 4 of the drawings which shows this valve in cross-section. High pressure oil from the pump 64 (Fig. 5) passes through line 80 and into a chamber 95 of valve 61. This chamber is communicatively connected by a bore 96 with a master relief valve 97. The setting of the valve 97 determines the maximum pressure at which the system can be operated and, should the pressure in chamber 95 exceed this predetermined pressure, the valve 97 will lift off its seat and permit fluid to escape from the chamber 95 into a low-pressure chamber 98 which is connected with the oil tank 78 and, therefore, is at atmospheric pressure. The flow of high pressure oil from the chamber 95 to either port 99 or port 100, which ports are connected with lines 58 and 57, respectively, for the power-steer cylinder, may be controlled by shifting the spindle 84 up or down. If the spindle 84 is lowered, oil from the chamber 95 may flow through a passageway 101, around the reduced portion 102 of the spindle 84 and through passageway 103 into port 99 and, thence, through line 58 to one end of the power-steer cylinder 52. Oil in the opposite end of the cylinder may escape through line 57 and port 100 which port, when the spindle 84 is lowered, is communicatively connected with a passageway 104 which communicates with the low-pressure chamber 98.

If the spindle 84 is raised, high pressure oil from chamber 95 will pass around the reduced portion 105 of the spindle and into the port 100 which is connected by line 57 to one end of the cylinder 52. Oil in the opposite end of the cylinder may be returned through line 58 to port 99 which, when the spindle 84 is raised, is communicatively connected with a low-pressure passageway 106 which is communicatively connected with the low-pressure chamber 98.

For the purpose of the present invention, it is essential that the oil supplied to the pressure control cylinder 60 be maintained at a constant, predetermined pressure. For this purpose, the valve 61 is provided with a pressure control device whereby the oil in a passageway 107, adjacent the spindle 85, may be maintained at a predetermined, constant pressure. This pressure may be adjusted, as desired, by suitable turning of the adjusting screw 90 which, through a spring 91, controls the pressure required to raise a pilot valve 108 off its seat. This valve controls the pressure in a chamber 109 which communicates with the upper side of a pressure regulator piston 111 which is slidably received within a bore 92 provided in the valve body. The piston 111 is provided at its upper end with a stem 93 which is guided in an aperture provided in a bushing 94. The piston is also provided with a downwardly extending stem 120 having a valve seat 121 formed on the bottom thereof. The two sides of the piston 111 are of equal area and both are normally subjected to the same pressure, the pressure on the lower side being communicated to the upper side through a metering orifice 110 and the chamber 109. The piston is, therefore, normally in hydraulic balance and held on its seat by a light spring 113.

Should the pressure in the passageway 107, i. e., the pressure acting on the underside of the piston 111, exceed the pressure setting of the pilot valve 108 as established by spring 91 and adjusting screw 90, valve 108 will be lifted from its seat thereby permitting fluid to flow past the valve 108 and into the low-pressure chamber 98. At the same time, oil will flow through the metering orifice 110 thereby inducing a pressure differential across the orifice so that the pressure on the upper side of piston 111 will now be less than the pressure on the lower side thereof. Hence, the piston will be raised off its seat 121 and oil will flow past the seat 121 and through a bore 112 which communicates with the low-pressure passageway 104. Pressure on the underside of piston 111 will thereby be reduced thus restoring the hydraulic balance of piston 111. Hence, the piston 111 will always assume a position wherein the downward forces acting on the piston are exactly counterbalanced by the upward forces acting thereon, thereby maintaining the piston in equilibrium and the pressure in the passageway 107 constant.

When the spindle 85 is in its neutral or central position as shown in Fig. 4, oil from the passageway 107 will be permitted to flow through the bore 114 extending through the center of the spindle 85 and, thence, through channel 115 to the low-pressure chamber 98. Hence, oil will flow idly through the system and practically no load will be applied to the pump 64. If, however, either valve spindle 84 or 85 is moved from the neutral position shown in Fig. 4, the bore 114 will be cut off from the low pressure chamber 98 and the pressure in the chamber 95 and the passageway 107 will rise to the designated operating pressure for the system.

The valve spindle 85 controls the flow of fluid under constant pressure from the passageway 107 to either of the ports 116 or 117 in the same manner as the control of fluid from the passageway 101 is controlled to the ports 99 and 100 by the spindle 84. That is, when the spindle 85 is lowered, fluid under pressure from passageway 107 may flow around the reduced portion 118 of the spindle 85 and into the port 116 which is connected by line 74 with one end of the pressure control cylinder 60. Oil in the opposite end of cylinder 60 may return through line 75 to the port 117 which, when the spindle is lowered, will be communicatively connected with the low-pressure channel 104. In like manner, when the spindle 85 is raised, high pressure oil from the passageway 107 may flow around the reduced portion 119 of the spindle and through port 117 and line 75 to one end of the cylinder 60. Oil from the opposite end of the cylinder may return through line 74 to port 116 which, when the spindle 85 is raised, will be communicatively connected with the low-pressure channel 106.

From the foregoing description it will be seen that by suitable adjustment of the pressure adjusting screw 90 (Fig. 4), a predetermined, constant torque may be applied by the cylinder 60 to the walking beam 40 tending to rock the beam about its pivot rod 41. It will also be seen that this torque may be applied in either direction by raising or lowering the valve spindle 85. Hence, the force applied by the rolls 29 and 30 to the surface being rolled may be adjusted and proportioned between the rolls in any desired ratio and this selected loading on the rolls will be maintained constant throughout the rolling operations performed by the road roller.

Figure 3:
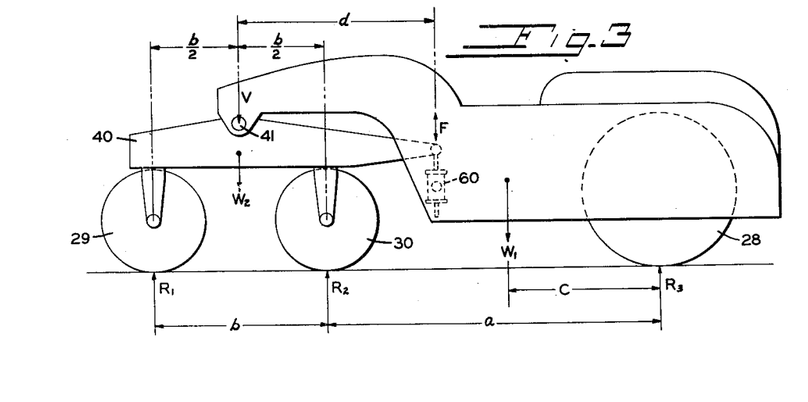
Fig. 3 is a schematic view of a three-axle road roller of the type shown in Fig. 1, this view illustrating the forces and moments which require consideration in determining the pressure applied by the several rolls.

To provide a better understanding of the forces which must be taken into account in the design of a pressure control system for a three-axle tandem road roller of the type shown in Figs. 1 and 2, there is shown in Fig. 3 of the drawings a diagrammatic representation of the road roller with the forces and moments indicated thereon. In this view, arrows $R_1$, $R_2$ and $R_3$ indicate the reaction forces acting on rolls 29, 30 and 28. $W_1$ represents the weight of the main frame including the drive roll 28 and everything mounted on the frame, such as the engine 33, transmission 34, and so forth. $W_2$ represents the weight of the walking beam and guide rolls 29 and 30. F represents the force exerted by the pressure control cylinder 60 and has an assumed positive value when acting upwardly on the walking beam 40. V represents the force exerted by the main frame on the walking beam and has an assumed positive value when acting downwardly on the walking beam.

It can be shown that if the roll 30 is to be raised off the ground, F must equal $$\frac{b(W_1C + W_2(a=b/2))}{2d(a+b)}$$

In a similar manner, if roll 29 is to be raised off the ground, F must equal $$\frac{-b(W_1C + W_2(a+b/2))}{2ad}$$

The greater of these two values for F will determine the maximum force required of the hydraulic cylinder 60 which, in turn, determines the maximum pressure which must be delivered by the pump 64.

Through the functioning of the valve 61 previously described, herein, the pressure in the hydraulic system may be adjusted so that any weight ratio between rolls 29 and 30, or between reactions $R_1$ and $R_2$ in Fig. 3 may be selectively achieved and maintained. This selected weight ratio will be maintained in the manner described, while the walking beam 40 rocks as necessary on its pivot 41 to enable the rolls to follow the contour of the ground over which the roller is operating. All three rolls 28, 39 and 30 will follow the ground contour while maintaining the above-mentioned selected weight ratio or weight distribution on the rolls.

Figure 6:
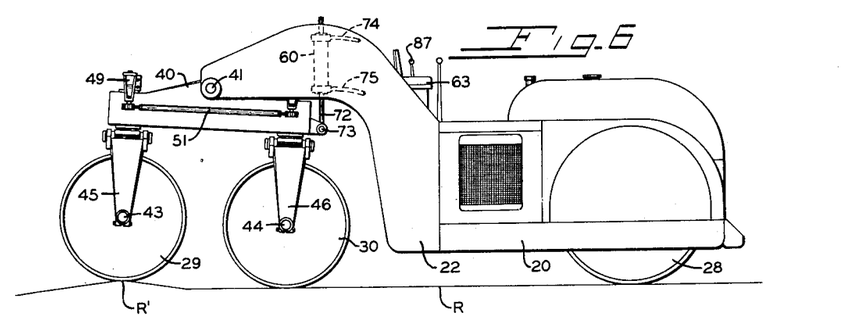
Fig. 6 is a side view of the roller shown in Fig. 1 in which the end guide roll is shown surmounting a high spot in the surface being rolled.
Figure 7:
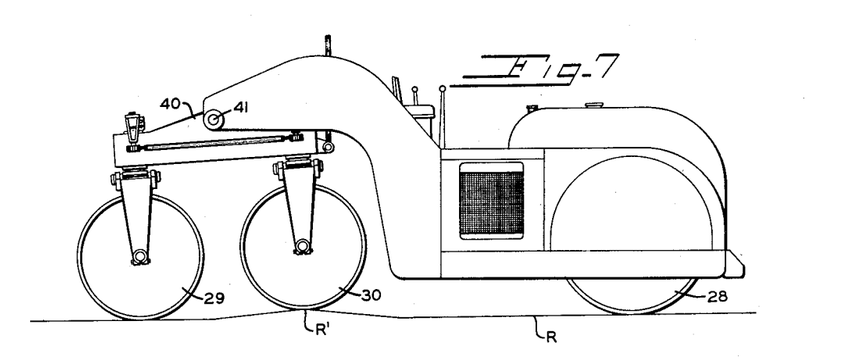
Fig. 7 is a view similiar to Fig. 6 showing the center guide roll surmounting a high spot in the surface being rolled.
Figure 8:
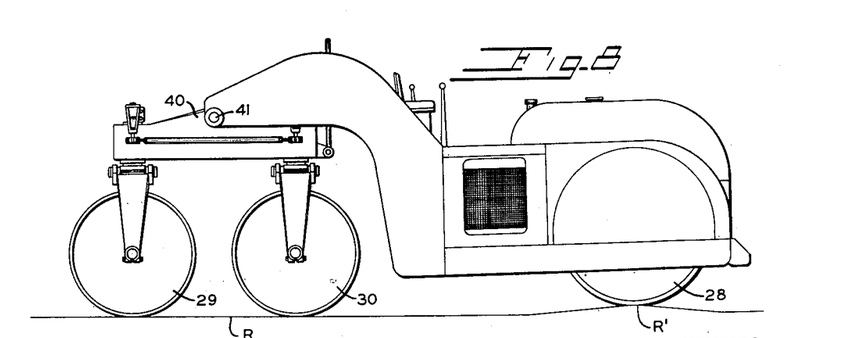
Fig. 8 is a view similar to Figs. 6 and 7 but showing the drive roll surmounting a high spot in the surface being rolled.

The ability of the three-axle tandem road roller shown in Figs. 1 and 2 to follow the contour of the surface being rolled is illustrated in Figs. 6, 7 and 8. Let it be assumed that the road roller is moving toward the left in each of these three views, and also that oil at a predetermined, constant pressure is being supplied through the line 74 to the upper end of the pressure control cylinder 60. Let it further be assumed that the pressure of the fluid flowing into the upper end of the cylinder 60 is such as to cause the roll 30 to bear against the road surface R with a pressure which is twice as great as that with which the leading guide roll 29 bears against the road surface R. In other words, the pressure control cylinder 60, acting through piston rod 72, tends to turn the walking beam 40 clockwise about its pivot 41 with a constant torque.

Assume now that the lead roll 29 encounters a high spot R' in the road as shown in Fig. 6. As the road roller moves to the left, the roll 29 will surmount the high spot R', the walking beam 40 rocking clockwise about its pivot 41 to assume the position shown in Fig. 6. In this new position of the walking beam 40, the pressure control cylinder 60 will still exert a constant torque on the walking beam tending to rotate it clockwise about its pivot 41. Hence, the pressure control means will continue to cause the roll 30 to bear against the road surface R with a pressure equal to twice the pressure with which the leading roll 29 bears against the road surface.

Assume now that the road roller continues to move toward the left until the guide roll 30 surmounts the high spot R' as shown in Fig. 7. When this occurs, the walking-beam 40 will be rotated counterclockwise from the position shown in Fig. 6 to the new position shown in Fig. 7 and the piston in the cylinder 60 will be moved upwardly against the resistance of the oil under pressure supplied to the upper end of the cylinder. The torque applied by the cylinder to the walking-beam 40 will, however, remain constant so that in the moved position of the beam, shown in Fig. 7, the pressure control means will still cause the guide roll 30 to bear against the road surface with a pressure which is twice as great as the pressure applied by the roll 29 against the road surface.

As the road roller continues to move toward the left, it finally reaches a point where the drive roll 28 surmounts the high spot R' thereby resulting in clockwise rotation of the walking-beam 40 about its pivot 41 from the position shown in Fig. 7 to the position shown in Fig. 8. However, the pressure control means will continue to apply a constant torque to the walking-beam 40 in the clockwise direction so that the guide roll 30 will continue to apply a pressure against the road surface which is twice as great as the pressure applied by the leading guide roll 29. Hence, it will be seen that the rolls of the road roller always will follow the contour of the surface being rolled and the ratio of the applied pressures of the rolls against the surface being rolled always will remain constant despite irregularities in the surface over which the roller travels.

In the foregoing example of the operation of the pressure control means when the roller is operating over an irregular surface in the manner illustrated in Figs. 6, 7 and 8, it will be understood that any desired ratio of applied pressures of the rolls 29 and 30 could be selected in the place of the particular one chosen here for purposes of illustration. For example, by positioning the valve spindle 85 in its neutral position and opening the cut-off valve 77 so as to permit oil flow between opposite ends of the cylinder 60 through the shunt line 76, the rolls 29 and 30 will be caused to bear against the road surface with equal pressures. If, now, valve 77 is closed and fluid under pressure is admitted to the upper end of the cylinder 60, the roll 30 will take on an increased share of the weight of the roller while the roll 29 will assume a smaller share of the weight. If the pressure applied to the upper end of the cylinder 60 be sufficiently great, the roll 29 will be lifted entirely off the ground so that the roll 30 will carry the entire weight of the forward end of the roller. This situation may be reversed, of course, by applying oil under pressure to the lower end of the cylinder 60, after closing the cut-off valve 77, so that the guide roll 29 will assume a greater portion of the weight than the guide roll 30. The ratio of the weight carried by the two rolls 29 and 30 will depend, of course, on the pressure of the fluid supplied to the lower end of the pressure control cylinder 60. If this pressure be great enought, the roll 30 will be lifted clear of the ground and the roll 29 will carry all of the weight on the forward end of the roller.

Figure 9:
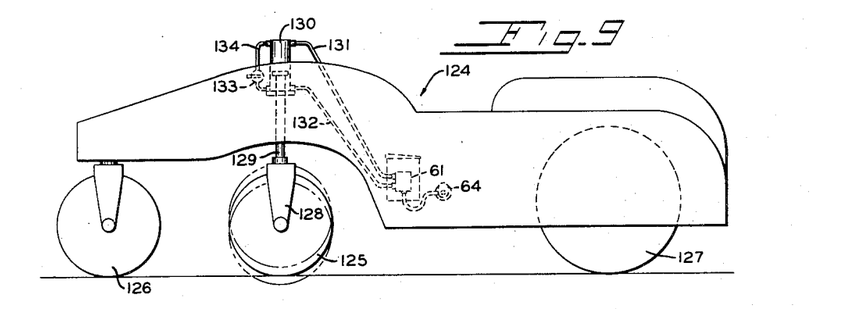
Fig. 9 is a side view of another form of three-axle tandem road roller in which my novel pressure control means is applied to the center guide roll.

While the type of road roller illustrated in Figs. 1 and 2 is admirably suited for use in connection with my pressure control means, it is to be realized that my invention could be applied with equal facility to other types of road rollers having three or more axles arranged in tandem. For example, as shown in Fig. 9, my pressure control means might be applied to the middle guide roll 125 of a three-axle road roller 124. As herein shown, the leading guide roll 126 is mounted in the conventional manner in the roller frame so that it may swivel about a vertical axis, but will be held against vertical displacement. As shown in Fig. 9, the middle guide roll 125 is carried by middle guide roll 125 is carried by a steering yoke 128 having a king pin 129 which is mounted for vertical sliding movement relative to the frame of the roller. The king pin 129 is connected to the piston of a hydraulic cylinder 130 secured to the frame of the roller. By supplying fluid under pressure through a line 131 to the upper end of the cylinder 130, and returning the fluid from the lower end of the cylinder through a line 132, the roll 125 may be urged downwardly so as to bear with increased pressure against the surface being rolled. Fluid under pressure may be supplied from the oil pump 64 supplying oil under pressure to the pressure control valve 61, which as previously explained, permits oil, under a constant, predetermined pressure to be supplied to either end of the pressure control cylinder. In the construction shown in Fig. 9, there would seem to be no occasion for supplying oil under pressure to the lower end of the cylinder 130 unless it be for the purpose of lifting the roll 125 clear of the ground so as to cause the roller to operate as a two-axle tandem. If desired, of course, the roll 125 could be permitted to float freely on the ground by positioning the valve spindle 85 in its neutral position and opening a cut-off valve 133 so as to permit oil to flow between the upper and lower ends of the cylinder 130 through a shunt line 134.

When fluid under a predetermined, constant pressure is supplied through the line 131 to the upper end of the cylinder 130, the roll 125 will be urged downwardly against the surface being rolled with a constant pressure and a predetermined distribution of weight between the rolls 125 and 126 will be effected. Of course, the greater the pressure applied to the cylinder 130, the greater will be the proportion of the weight carried by the roll 125 until the point is reached where the roll 126 will carry little or no weight while the roll 125 will carry practically all of the weight. As in the case of the walking-beam type of roller shown in Figs. 1 and 2, the ratio of the weight carried by the rolls 125 and 126 will be maintained constant even though the roller is operating over uneven ground. This is due to the fact that the pressure applied to the roll 125 will be maintained constant and uniform regardless of vertical positioning of this roll as it travels over the ground.

Figure 10:
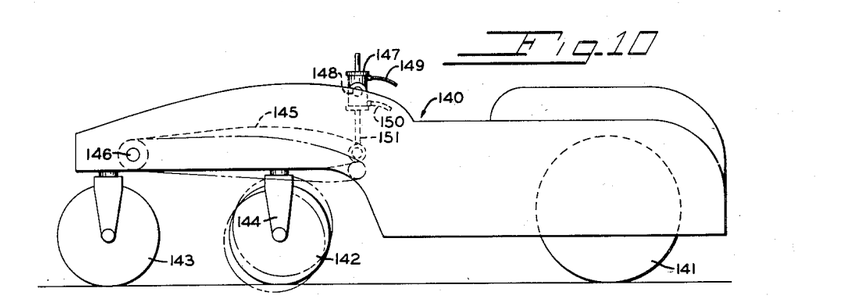
Fig. 10 is a side view of another form of three-axle tandem road roller in which my novel pressure control means is applied to a lever arm which carries the center guide roll.

In Fig. 10 is shown still another form of three-axle tandem road roller to which my novel pressure control means may be applied. As shown in Fig. 10 the roller 140 is provided with a drive roll 141, a middle guide roll 142 and a leading guide roll 143. The leading guide roll 143, like the leading guide roll 126 in Fig. 9, is mounted in the frame to swivel about a vertical axis but is not capable of being displaced vertically relative to the frame. The middle guide roll 142 is supported by a steering yoke 144 which is swivably supported on an arm 145 pivoted at 146 on one end of the roller frame. Pivotally connected to the opposite end of the arm 145 is a piston rod 151 of a pressure control cylinder 147 which is supported on the frame of the roller by trunnions 148. Fluid under pressure may be supplied either to the upper end of the cylinder 147 through a line 149, or to the lower end of the cylinder through a line 150. As in the case of the roller shown in Fig. 9, fluid under pressure may be supplied by pump 64 and regulated and controlled by pressure control valve 61. By supplying fluid at predetermined, constant pressure to the upper end of the cylinder 147, the arm 145 will have a constant torque applied thereto tending to turn the arm about its pivot 146 in a clockwise direction. This will cause the roll 142 to be urged downwardly so as to bear with a constant, predetermined pressure against the surface being rolled. The ratio of the weight carried by the roll 142, as compared with that carried by the roll 143, will depend upon the pressure of the fluid supplied to the upper end of the cylinder 147. If this pressure is sufficiently great, the roll 142 will carry all of the weight on the forward end of the roller while the roll 143 will carry none. If desired, of course, pressure may be supplied to the lower end of the cylinder through the line 150 so as to lift the roll 142 off the ground and cause the roll 143 to carry all of the weight. Also, by by-passing the oil between the opposite ends of the cylinder 147 by means of a shunt line, such as the line 134 shown in Fig. 9, the roll 142 may be permitted to float freely on the ground and follow the contour of the surface being rolled. In this case, the roll will bear against the surface with a pressure equal to the weight of the roll plus the weight of the supporting structure associated therewith.

Since the torque applied by the cylinder 147 to the arm 145 will be maintained constant, the roll 142 will bear against the ground surface with a constant pressure and this pressure will be maintained uniform regardless of irregularities occurring in the surface being rolled. Hence, the weight distribution on the rolls of the roller 140 may be selected as desired and maintained constant throughout the entire rolling operation.

Figure 11:
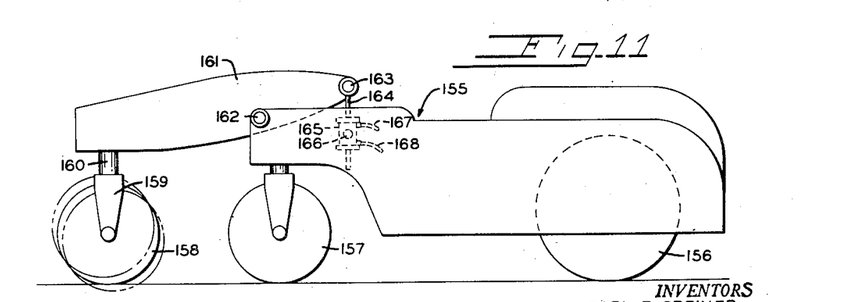
Fig. 11 is a side view of still another form of three-axle tandem road roller in which my novel pressure control means is applied to a lever arm carrying the end guide roll.

In Fig. 11 of the drawings, is shown another form of three-axle tandem road roller to which my novel pressure control means may be applied. As herein shown, a road roller 155 is provided with a drive roll 156, a middle guide roll 157, and a leading guide roll 158. In this case, the leading guide roll 158 is arranged for vertical displacement whereas the middle guide roll 157 is prevented against vertical displacement relative to the frame of the roller. The leading guide roll 158 is carried by a steering yoke 159 provided with a king pin 160 which is journaled for rotation about a vertical axis in an arm 161. The arm 161 is journaled on the roller frame for rotation about a horizontal pivot 162. Connected to the free end of the arm 161 at 163 is a piston rod 164 of a pressure control cylinder 165 which is supported on the roller frame by trunnions 166. Fluid under pressure may be applied to either end of the cylinder 165 by pressure lines 167 and 168. Fluid under pressure may be supplied by pump 64 which delivers the fluid to valve 61 which regulates pressure of the fluid and controls its flow to the cylinder 165. If fluid under constant pressure is applied to the lower end of the cylinder through the line 168, the arm 161 will be urged to rotate with a constant torque in a counterclockwise direction about its pivot 162 thereby causing the roll 158 to be urged into contact with the surface being rolled with a predetermined, constant pressure. If the pressure of the fluid applied to the lower end of the cylinder 165 is sufficiently great, all of the weight on the forward end of the roller will be carried by the roll 158 and the roll 157 will carry none of the weight. On the other hand, if fluid under pressure is applied to the upper end of the cylinder 165 through the line 167, a clockwise torque will be applied to the arm 161 thereby tending to raise the roll 158 off of the ground so that the roll 157 will carry all of the weight on the forward end of the roller while the roll 158 will carry none. If desired, the cylinder 165 may be provided with a shunt line connecting the opposite ends thereof so as to permit the piston to float freely within the cylinder 165 and the leading guide roll 158 to bear against the surface being rolled with a pressure equal to the weight of the roll and its supporting mechanism.

Since the pressure applied by the roll 158 against the surface being rolled will be constant when the fluid under a constant, predetermined pressure is supplied to the lower end of the cylinder 165, the weight distribution between the rolls of the roller 155 will be maintained constant despite irregularities occurring in the surface being rolled.

Figure 12:
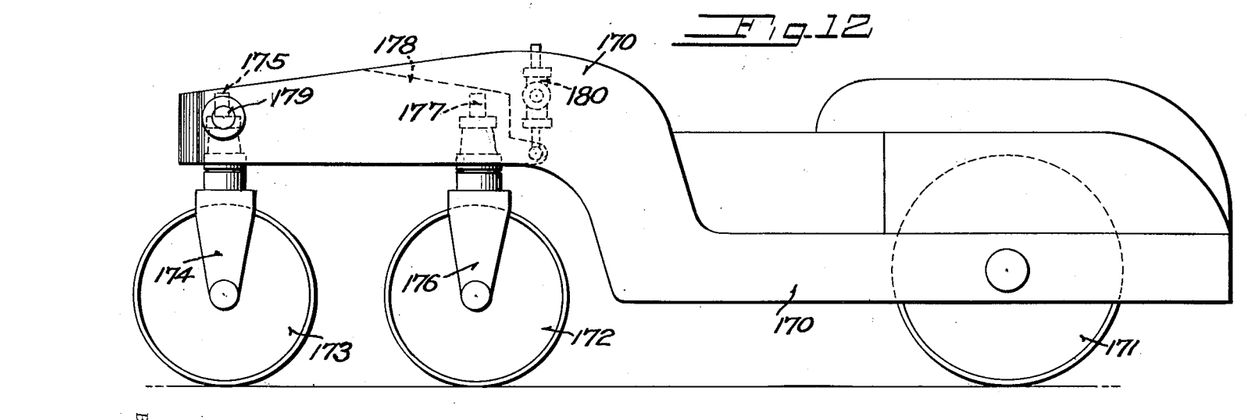
Fig. 12 is a side view of a still further form of three-axle tandem road roller in which my novel pressure control means is applied to a lever arm carrying both guide rolls.
Figure 13:
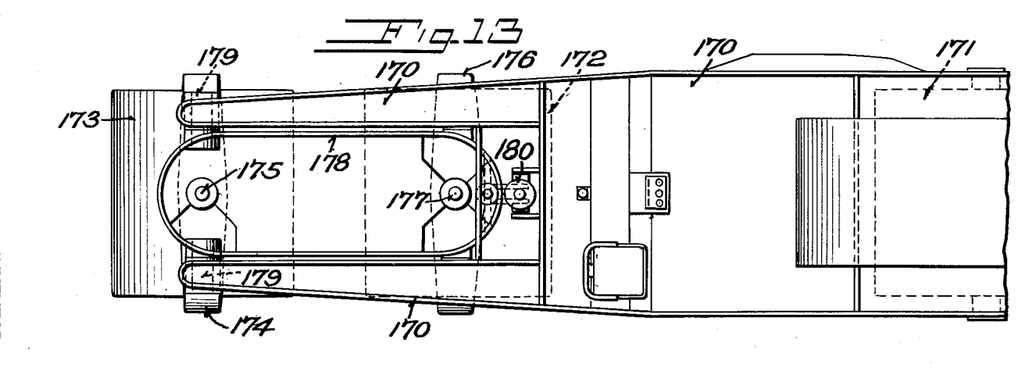
Fig. 13 is a top plan view of the form of machine shown in Fig. 12.

In Figs. 12 and 13 a still further form of three-axle tandem roller is shown in which my novel pressure control means is applied. This modification is similar to that shown in Figs. 10 and 11, the road roller 170 being provided with a drive roll 171, a middle guide roll 172 and a leading or end guide roll 173. The leading guide roll 173, like the leading guide roll 143 of Fig. 10, is mounted in a yoke 174 having a king pin 175, while the middle guide roll 172 is mounted in a yoke 176 having a king pin 177, both of which king pins 175 and 177 are carried in trunnions in a lever 178 which is journaled on horizontal pivots 179 disposed in alignment with and at opposite sides of king pin 175 of the leading guide roll 173.

In Fig. 10 the king pins of the guide rolls 143 and 142 do not in fact remain on a fixed center distance when the lever 145 swings about its pivot 146. Therefore, because of steering linkage connecting the two steering rolls a binding action might be induced in the steering linkage of the roller shown in Fig. 10 by movement of the beam 145. Although this binding could be of magnitude sufficient to be objectionable, it is not necessarily impractical. In Figs. 12 and 13, however, the axis of the pivots 179 intersects the axis of the end king pin 175, and both king pins 175 and 177 are directly carried by the pivoted lever 178, and therefore no center distance change can be involved when lever 178 tilts or pivots.

In Figs. 12 and 13 fluid under pressure may be supplied either to the upper end of the cylinder 180 or to the lower end of said cylinder, to tilt the beam 178 as in the case of the roller shown in Fig. 10, and the operation of the piston within the cylinder 180 is the same as described in connection with the preceding figures; and thus the weight distribution on the rolls of the road roller 170 may be selected as desired and maintained constant throughout the entire rolling operation. In this modification (Figs. 12 and 13) when the lever 178 is tilted downwardly or upwardly the center guide roll 172 will also be depressed or raised according to the operation of the cylinder 180. The king pin 175 for the end or leading guide roll 173, however, will remain substantially fixed as far as elevation is concerned owing to the intersecting arrangement of the pivots 179 and 175. However, the king pin 175 being carried by the lever 178 will merely tilt therewith as distinguished from being raised or lowered by and with the lever 178 except for perhaps an infinitesimal amount. The operation of the roller 170 shown in Figs. 12 and 13 is otherwise identical with that previously described with respect to the roller shown in Fig. 10.

Although I have described my invention in considerable detail and have, therefore, utilized certain specific terms and language herein, it is to be understood that the present disclosure is illustrative rather than restrictive and that changes and modifications may be resorted to without departing from the spirit or scope of the claims appended hereto.

I claim:

1. A self-propelled roller comprising a frame, a drive roll mounted on one end of said frame, an engine in the frame disposed adjacent the drive roll, means for driving the drive roll by said engine; a beam rockably mounted on the other end of said frame on a horizontal axis, a pair of guide rolls swivelly mounted in said beam about vertical axes located fore and aft of the horizontal axis about which said beam rocks, pressure means for applying constant torque to said beam, including a fluid line and a pump, and means for adjusting the torque exerted by said pressure means to any desired value, while maintaining steering and driving contact with the ground surface said adjusting means comprising a hydraulic piston for applying a constant torque to said beam, a pressure control in the fluid line between the pump and piston having a low pressure chamber therein; and an adjustable spring-loaded pressure control valve to automatically open and close the passageway to said low pressure chamber at predetermined pressures to relieve overload pressures in the piston supply line and to maintain said pressure at a predetermined constant whereby the proportion of the total weight of the roller carried by each of said guide rolls may be selected as desired and maintained constant during rolling operations.

2. The road roller of claim 1 including means for reversing the torque exerted by said pressure means on said beam.

3. The road roller of claim 1 in which said adjusting means includes a manually adjustable element on said pressure control for controlling the pressure at which fluid will be delivered by said pump to said cylinder.

4. A self-propelled road roller comprising a frame, a drive roll mounted on one end of said frame, an engine in the frame disposed adjacent the drive roll, means for driving the drive roll from said engine; a beam rockably mounted on the other end of said frame on a horizontal axis, a pair of steering yokes swivelly mounted in said beam about vertical axes located fore and aft of the horizontal axis about which said beam rocks, a guide roll supported on each steering yoke for rotation about a horizontal axis, steering connections for swiveling both of said yokes in unison to effect coordinated steering of the roller by said guide rolls, pressure means for applying a constant torque to said beam, including a fluid line and a pump, and means for adjusting the torque exerted by said pressure means to any desired value, said adjusting means comprising a hydraulic piston for applying a constant torque to said beam, a pressure control means in the fluid line between the pump and piston having a low pressure chamber therein and an adjustable spring-loaded pressure control valve to automatically open and close the passageway to said low pressure chamber at predetermined pressures to relieve overload pressure in the piston supply line and to maintain said pressure at a predetermined constant, while maintaining steering and driving contact with the ground surface, whereby the proportion of the total weight of the roller carried by each of said guide rolls may be selected as desired and maintained constant during rolling operations.

5. A self-propelled road roller comprising a frame, a drive roll and guide rolls arranged in tandem with respect to said frame; an engine in the frame disposed adjacent the drive roll, means for driving the drive roll from said engine, a lever pivotally mounted on said frame to pivot about a horizontal axis; means for rotatably mounting the guide rolls on said lever; means on said lever for supporting at least one of said guide rolls; means connected between the frame and said lever for applying a downward pressure on said one guide roll in opposition to the reaction force exerted thereon by the surface being rolled including a fluid line and pump; and means for adjusting said pressure applying means to control the downward pressure exerted thereby on said one guide roll while maintaining steering and driving contact with the ground surface, said adjusting means comprising a hydraulic piston for applying a constant torque to said lever, a pressure control means in the fluid line between the pump and piston having a low pressure chamber therein, and an adjustable spring-loaded pressure control valve to automatically open and close the passageway to said low pressure chamber at predetermined pressures to relieve overload pressures in the piston supply line and to maintain said pressure at a predetermined constant, whereby the proportion of the total weight of the roller carried by said one guide roll may be selected as desired and maintained constant during rolling operations.

6. In a road roller as set forth in claim 5, said adjusting means including a manually adjustable element on said pressure regulator for controlling the pressure at which fluid will be delivered by said pump to said cylinder.

7. In a road roller as set forth in claim 5, vertical king posts and yokes for the respective guide rolls; said guide rolls comprising a pair; and the horizontal pivot of the lever being disposed intermediate the said pair of king posts.

8. In a road roller as set forth in claim 5, vertical king posts and yokes for the respective guide rolls; the guide rolls comprising a pair; and the horizontal pivot of the lever being disposed opposite one of said pair of king posts.

9. A road roller comprising a drive roll and a plurality of guide rolls arranged in tandem, a roller frame supported by said rolls, an engine disposed adjacent the drive roll, means for driving the drive roll from said engine, a lever mounted on said frame to rock about a horizontal axis, means on said lever for supporting at least one of said guide rolls; and adjustable pressure means in a fluid line including a pump connected between said frame and said lever tending to rock said lever about its axis with a uniform torque so as to cause said one guide roll to be pressed against the surface being rolled with a constant, uniform pressure while maintaining steering and driving contant with the ground surface, said adjusting means comprising a hydraulic piston for applying and driving contact with the ground surface, said adjusting means in the fluid line between the pump and piston having a low pressure chamber therein, and an adjustable spring-loaded pressure control valve to automatically open and close the passageway to said low pressure chamber at predetermined pressures to relieve overload pressures in the piston supply line and to maintain said pressure at a predetermined constant.

10. A road roller comprising a drive roll and a plurality of guide rolls arranged in tandem, a roller frame supported by said rolls, an engine disposed adjacent the drive roll, means for driving the drive roll from said engine, a lever mounted on said frame for supporting one of said guide rolls, pressure control means including a fluid line and pump connected between said frame and said lever tending to rock said lever about its axis with a uniform torque and cause said one guide roll to be pressed against the surface being rolled with a constant, uniform pressure while maintaining steering and driving contact with the ground surface; and means for adjusting said pressure control means to enable the downward pressure exerted by said one guide roll against the surface being rolled to be adjusted as desired, said adjusting means comprising a hydraulic piston for applying a constant torque to said lever, a pressure control means in the fluid line between the pump and piston having a low pressure chamber therein, and an adjustable spring-loaded pressure control valve to automatically open and close the passageway to said low pressure chamber at predetermined pressures to relieve overload pressures in the piston supply line and to maintain said pressure at a predetermined constant.

11. A road roller comprising a frame, a drive roll mounted on one end of said frame, an engine disposed adjacent the drive roll, means for driving the drive roll from said engine, a guide roll, a steering yoke therefor mounted on the other end of said frame to swivel about a vertical axis, a lever mounted on said other end of said frame to rock about a horizontal axis, a second guide roll, a steering yoke therefor mounted on said lever to swivel about a vertical axis, pressure means including a fluid line and pump connected between said frame and said lever to rock said lever and apply a downward pressure on said second guide roll in opposition to the reaction force exerted thereon by the surface being rolled; and means for adjusting said pressure means to control the downward pressure exerted thereby on said second guide roll while maintaining the steering and driving contact with the ground surface, said adjusting means comprising a hydraulic piston for applying a constant torque to said lever, a pressure control means in the fluid line between the pump and piston having a low pressure chamber therein, and an adjustable spring-loaded pressure control valve to automatically open and close the passageway to said low pressure chamber at predetermined pressures to relieve overload pressures in the piston supply line and to maintain said pressure at a predetermined constant whereby the proportion of the total weight of the roller carried by said second guide roll may be selected as desired and maintained constant during rolling operations.

References Cited in the file of this patent

UNITED STATES PATENTS

| | | |
|---|---|---|
| 1,999,665 | Schroeder | Apr. 30, 1935 |
| 2,089,591 | Aitken | Aug. 10, 1937 |
| 2,127,485 | Owens | Aug. 16, 1938 |
| 2,132,059 | Trembly | Oct. 4, 1938 |
| 2,433,268 | Fellabaum | Dec. 23, 1947 |
| 2,612,090 | Revers | Sept. 30, 1952 |